United States Patent
Wang

(10) Patent No.: US 7,649,653 B2
(45) Date of Patent: Jan. 19, 2010

(54) PROCESSING APPARATUS AND METHOD FOR ENHANCING IMAGE COLOR

(75) Inventor: Dongjian Wang, Shanghai (CN)

(73) Assignee: Pixelworks, Inc., Tualatin, OR (US)

( * ) Notice: Subject to any disclaimer, the term of this patent is extended or adjusted under 35 U.S.C. 154(b) by 513 days.

(21) Appl. No.: 11/470,231

(22) Filed: Sep. 5, 2006

(65) Prior Publication Data

US 2007/0070369 A1 Mar. 29, 2007

(51) Int. Cl.
*H04N 1/40* (2006.01)
(52) U.S. Cl. ......................... 358/2.1; 358/504
(58) Field of Classification Search ................ 358/500, 358/504, 516, 518–520, 522–523, 530, 539, 358/2.1, 1.9
See application file for complete search history.

(56) References Cited

U.S. PATENT DOCUMENTS 5,781,184 A * 7/1998 Wasserman et al. ......... 348/571

6,201,581 B1 * 3/2001 Moriwake et al. ........... 348/587

* cited by examiner

*Primary Examiner*—Thomas D Lee
*Assistant Examiner*—Stephen M Brinich
(74) *Attorney, Agent, or Firm*—Marger Johnson & McCollom, P.C.

(57) ABSTRACT

We describe a processing apparatus and associated method for enhancing image color that includes a color space regional parameter storage module to store parameters of a color space region. A plurality of color space regional decision and enhancement attenuation calculation modules each calculate a color enhancement amplitude of a pixel responsive to the parameters. And a color space component enhancement module calculates a component of the color enhancement amplitude of the pixel in its color space. The processing apparatus and associated method achieve improved color enhancement in a specific region of the color space.

8 Claims, 3 Drawing Sheets

PROCESSING APPARATUS AND METHOD FOR ENHANCING IMAGE COLOR

This application claims the priority of Chinese Patent Application No. 2005 1 0029730.5 filed on Sep. 5, 2005, in the China Intellectual Property Office, the disclosure of which we incorporate here in its entirety by reference.

FIELD

The present relates to a processing apparatus and method capable of enhancing image color. More particularly, the present relates to a processing apparatus and method for enhancing image color in a color space region.

BACKGROUND

People's requirements realism and purity are more and higher in the case of collecting, displaying and printing of the image/video. Meantime, capturing during the process of display, non-matching and non-linearity characters between sensitization elements of a capturing apparatus for capturing an image of display and luminescence/color elements of a display/print apparatus cause that these capturing data must be reprocessed to recover nature color and avoid the color component not suitable for human eyes as possible under the existing parts of a physical apparatus. Since requirements for interested color of human eyes under different environments demand that factual collecting and capturing apparatus of image/video have functions of enhancing, modifying and adjusting. For example, there's image saturation, color adjustment and specific color enhancing and modifying function in a TV and video camera.

The existing display apparatus has the function of whole modification of color and hue for image/video, especially to saturation, color/hue and so on. One of the simplest and most universal apparatus and method is as follows. First, color space conversion module converts image/video from RGB or CMYK etc. color space to YUV or YCbCr etc. color space. Second, coordinates conversion module separates a color component into dependent component such as saturation, color/hue. Then in the case of modifying the saturation component, saturation modification module modifies a saturation component to multiply by a component α, when α>1, the whole image/video saturation is enhanced; For modifying image/video color saturation, hue modification module modifies the phase of a UV plane by adding a chroma component θ to change the hue of the whole image/video.

However, all these adjusting functions can not be used in a specific region of the color space but in the whole color space. Therefore, in such above-presented method, there are a lot of defects as following: 1. Overly adjusting the saturation of the image/video possibly so as to color the gray scale strip and achromatous object, even color some objects out of bound to be another unacceptable color for human eyes, for example, human face is changed in red. 2. Simply adjusting the saturation of color may cause some data extending out of the largest range to shrink the factual color space, therefore, lowering the image/video quality to some extent. 3. In the case where the hue of some colors is to be modified, the hue of other colors is wrongly changed at the same time possibly. Such a case needs us to avoiding.

SUMMARY

An object is to provide a processing apparatus for enhancing the image color in a specific region of the color space.

Another object is to provide a processing method for enhancing the image color to overcome disadvantages associated with known image processing apparatus.

We describe embodiments in detail with reference to the accompanying drawings.

BRIEF DRAWINGS DESCRIPTION

DETAILED DESCRIPTION

A device first converts the individual and collective pixel (image point) into a corresponding color representation space (e.g., RGB, CMY, YUV, CIE, or any other color space) and attendant coordinates space (e.g., Cartesian coordinate system, polar coordinate system, and any other coordinate system). In accordance with color region to be enhanced defined by the parameters, to calculate whether the color of the pixel is needed to be enhanced or adjusted, and calculate the direction and magnitude of the enhanced color, then to perform the processing of color enhancement of the pixel and convert the pixel into other color space.

Figure 1:
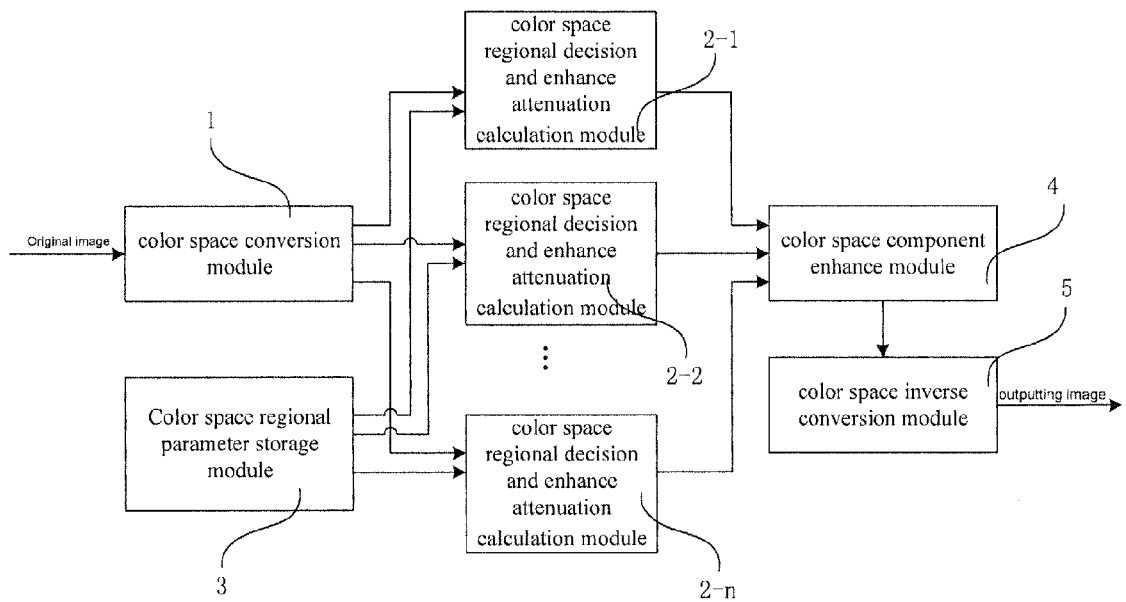
FIG. 1 is a block diagram of an embodiment of a processing apparatus for enhancing the image color.

As shown in FIG. 1, it is illustrated a structure diagrammatic sketch of an embodiment of a processing apparatus for enhancing the image color. The apparatus includes n color space regional decision and enhance attenuation calculation modules 2-1~2-n, the color space conversion module 1, the color space regional parameter storage module 3 and the color space component enhance module 4 respectively coupled to all of these above-mentioned color space regional decision and enhance attenuation calculation modules 2-1~2-n, further including the color space inverse conversion module 5 coupled to the color space component enhance module 4.

The coordinate $(X_1, X_2, \ldots X_n)$ of a pixel in an original color space is converted to the coordinate $(Y_1, Y_2, \ldots Y_n)$ in a color space with color enhancement by the color space conversion module 1. The original color space can use CMY, HIS, YIQ or self-defined color space etc. If only the color space can represent the collective of colors, which can be used as an effective color space. For different color spaces, the color space conversion module 1 can differently perform converting. For example, the matrix uses for converting RGB space to YUV(YCbCr) space simply. Corresponding iterated closeness algorithm is introduced into the approach of converting coordinate of YUV space to polar coordinate $(Y, r, \theta)$.

The color space regional decision and enhance attenuation calculation modules 2-1~2-n calculate the enhancement region in color space of the pixel, the enhancement amplitude $(\Delta_1, \Delta_2, \ldots \Delta_n)$ and the flat transition around the edge of enhancement region in accordance with the collective of region parameters of $(Y_1, Y_2, \ldots Y_n)$ space and attenuation definition deployed by the color space regional parameter storage module 3.

The color space component enhance module 4 implements adjusting amplitude $(\Delta_2, \Delta_2, \ldots \Delta_n)$ of components in all direction based on enhancement components of each component resulted from calculation of enhancement amplitude. The process of adjustment comprises compensation of luminance, limitation of data edge and so on.

Each component enhanced is converted to $(Z_1, Z_2, \ldots Z_n)$ require by other color space during followed process by the color space inverse conversion module 5.

Figure 2:
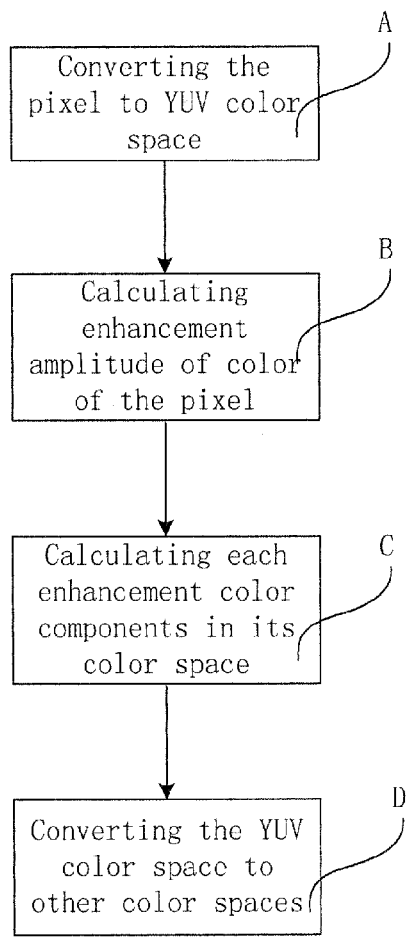
FIG. 2 is a flowchart of an embodiment of a method for enhancing the image color.

FIG. 2 is a flowchart of a method for enhancing the image color. In this exemplary embodiment, the blue, green, red, yellow and skin color are enhanced and adjusted.

Step A) the color space conversion module converts the image element (pixel, individual or collective image point) to be processed to the color space which is used for enhancement/adjustment.

If the image element is located in the color space same as the enhancement space, it will not be converted. In this embodiment, the coordinate of the pixel of image and video to be processed is (Y, U, V) in the YUV space. If the pixel is located in the other color space, firstly to convert the pixel to the corresponding color space, YUV color space. Simultaneously since modification is required for saturation and hue (tint), the coordinate of YUV space need to be converted to $(Y, r, \theta)$.

Step B) The color space regional decision and enhance attenuation calculation module calculates the enhanced amplitude of color of the pixel and sends to the color space component enhance module in accordance with the color enhancement parameters of each color space region deployed by the color space regional parameter storage module.

According to the collective p of parameters of each color space region deployed by the color space regional parameter storage module, to partition the region $\Omega$ of color space $(Y, r, \theta)$ which is to be enhanced color, for example, defining a three-dimensional region $$\Omega_i \square \{Y \in (Y_{s,i}, Y_{t,i}), r \in (r_{s,i}, r_{t,i}), \theta \in (\theta_{s,i}, \theta_{t,i})\} i = 1, \ldots, n,$$

n represents the number of regions, region be one or several;

Simultaneously, the distributing of YUV color space, the physical character of display apparatus and vision characteristic of human eye are considered. Each color enhancement region is corresponding to each region $\Omega$, in this embodiment, five regions are partitioned, i.e., five $\Omega$ spaces.

$$\Delta = f(Y, r, \theta, p) \ (Y, r, \theta) \in \Omega_i \quad (1)$$

Figure 3:
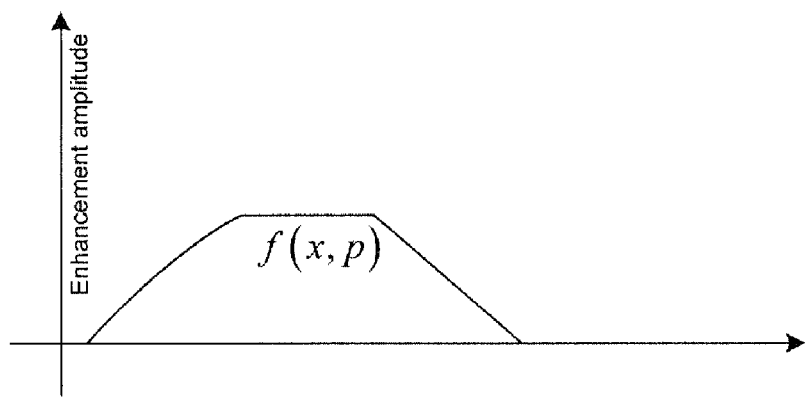
FIG. 3 is a chart for calculating the enhancement amplitude.

Calculating the enhancement amplitude of color, meantime considering two approaches for processing position partition of region $\Omega_i$ are available to the pixel $(Y, r, \theta)$, the first approach is to discriminate the coordinate $(Y, r, \theta)$, then to calculate the direction to be enhanced based on its located region(reference to FIG. 3), For example, $$\Delta = f(Y, r, \theta, p) \ (Y, r, \theta) \in \Omega_i \quad (1)$$

Where, $(Y, r, \theta) \in \Omega_i$ represents the discrimination result of region to decrease computational complexity of enhancement/adjustment amplitude, p represents reduction coefficient. Here, the setting of $\Delta$ is determined by the edge parameters $(Y_{s,i}, Y_{t,i}), (r_{s,i}, r_{t,i}), (\theta_{s,i}, \theta_{t,i})$ of region $\Omega_i$ and the reduction coefficient p of region. Generally speaking, the coordinate $(Y, r, \theta)$ of the pixel closer to the boundary of region $\Omega_i$, the weaker the intensity of enhancement is, vice verse, the further, the stronger it is. p determines the speed of the reduction, but the general intensity of enhancement will not go beyond the defined peak value.

Another approach is to use Serial or parallel pattern to respectively calculate the enhancement/adjustment range of the pixel $(Y, r, \theta)$ in each $\Omega_i$ region, for example, $$\Delta_i = f(Y, r, \theta, p) \ (Y, r, \theta) \in \Omega_i \quad (2)$$

The function f(.) can use different expressions, for example, $\Delta_i = \min(p*\text{Dist}((Y, r, \theta), \Omega_i \text{boundary}), H_i)$, wherein $\text{Dist}((Y, r, \theta), \Omega_i \text{boundary})$ represents the minimum distance from the enhanced pixel to the boundary of its corresponding located region $(Y_{s,i}, Y_{t,i}), (r_{s,i}, r_{t,i}), (\theta_{s,i}, \theta_{t,i})$. p represents corresponding reduction coefficient. And then each $\Delta_i$ is implemented combined adjustment (such as interpolation) to obtain the intensity $\Delta$ for enhancement and adjustment. The combined adjustment means that the settings are adjusted in the direction of each component (such as Y, r, $\theta$) at one time. In the serial pattern, the partition of the region $\Omega_i$ may be overlapped. However, the partition of the region $\Omega_i$ can be guaranteed non-overlapping of each region by controlling the set parameters of region $\Omega_i$. Generally speaking, the transition of adjusting amplitude of pixels which are around the boundary of the enhancement region ridden on the close parameter p is gently so as to avoid the crisis of the jump. The closer to the boundary of the region $\Omega_i$ the pixel is, the stronger the enhancement amplitude of the pixel is. Therefore the change of the enhancement amplitude of the pixel around the boundary of the region is not jumped but gently.

In this embodiment, verifying the blue, green, red, yellow and skin color, the enhancement amplitude is $\Delta_i = \min(0.8*\text{Dist}((Y, r, \theta), \Omega_i \text{boundary}), H_i)$ here, i equals to the blue, green, skin color, the value of $\Omega_i$ and H1 seeing the table 1.($\Omega_i$ bounded by the $(Y_{s,i}, Y_{t,i}), (r_{s,i}, r_{t,i}), (\theta_{s,i}, \theta_{t,i})$

TABLE 1

| | the color range | | | | | | |
|---|---|---|---|---|---|---|---|
| Region color | $Y_{s,i}$ | $Y_{t,i}$ | $r_{s,i}$ | $r_{t,i}$ | $\Theta_{s,i}$ | $\Theta_{t,i}$ | $H_{1,i}$ |
| blue | 0 | 150 | 10 | 120 | 270° | 10° | 100 |
| green | 0 | 160 | 10 | 120 | 180° | 270° | 100 |
| red | 0 | 120 | 60 | 120 | 80° | 170° | 80 |
| yellow | 160 | 255 | 80 | 128 | 140° | 225° | 60 |
| Skin Color | 80 | 200 | 20 | 60 | 70° | 160° | 20 |

According to the object of the color adjusting, except adjustment intensity the information of adjustment direction is needed. Such direction info may describe the info about changing in the same region, also may about changing in the direction of some pixel or some line.

Step C) the color space component enhance module calculates each enhanced color component in the color space which is located by the pixel in accordance with enhanced amplitude of color, and then outputs the sum of the enhanced color components added with the original color components of pixel.

In accordance with the adjusting information of color inside region calculated in step B), (including adjusting intensity $\Delta$ and adjusting direction), to compute the adjusting mete $(\Delta_Y, \Delta_r, \Delta_\theta)$ of three color components $(Y, r, \theta)$, such these adjusting mete of three color components is determined from function g(.):

$$\begin{cases} \Delta_Y = g_1(\Delta, \alpha_Y) \\ \Delta_r = g_2(\Delta, \alpha_r) \\ \Delta_\theta = g_3(\Delta, \alpha_\theta) \end{cases} \quad (3)$$

The function g (.) can be the linear or non-linear transformation function of adjusting intensity $\Delta$ and parameter $\alpha.(\alpha_R, \alpha_G, \alpha_B)$ respectively represents adjustment weight along three direction of RGB. The expression of g(.) can use many patterns, for example the simplest is $\Delta_y = g_r(\Delta, \alpha_y) = \alpha_y \cdot \Delta$;

In the adjustment of the skin color of this embodiment, adjustment in direction $\theta$ uses the non-linear transformation expression, the expression is defined as $$\Delta_\theta = g_3(\Delta, \alpha_\theta) = \begin{cases} \theta_{opt} - \theta, & \alpha_\theta \cdot \Delta > |\theta_{opt} - \theta| \\ -\alpha_\theta \cdot \Delta, & \text{otherwise}, \quad \theta > \theta_{opt} \\ \alpha_\theta \cdot \Delta, & \text{otherwise} \end{cases}$$

The expression in direction Y and r is $$\begin{cases} \Delta_{blue,Y} = \alpha_{blue,Y} \cdot \Delta_{blue} \quad \alpha_{blue,Y} \text{ enhancement gain in direction } Y, \\ \qquad\qquad\qquad\qquad\qquad \text{adjustable} \\ \Delta_{blue,r} = \alpha_{blue,r} \cdot \Delta_{blue,r} \quad \alpha_{blue,r} \text{ enhancement gain in direction } r, \\ \qquad\qquad\qquad\qquad\qquad \text{adjustable} \end{cases}$$

For the adjustment of the red, the expression in direction Y, r and $\theta$ is $$\begin{cases} \Delta_{red,Y} = \alpha_{red,Y} \cdot \Delta_{red} & \alpha_{red,Y} \text{ enhancement gain in direction } Y, \text{ adjustable} \\ \Delta_{red,r} = \alpha_{red,r} \cdot \Delta_{red} & \alpha_{red,r} \text{ enhancement gain in direction } \gamma, \text{ adjustable} \\ \Delta_{red,\theta} = \alpha_{red,\theta} \cdot \Delta_{red} & \alpha_{red,\theta} \text{ enhancement gain in direction } \theta, \text{ adjustable} \end{cases}$$

For the adjustment of the blue, green and yellow, the expression for adjusting in direction Y, r and $\theta$ uses the same as above-presented expression for the red adjustment. Alternatively, the expression in direction $\theta$ also can use the similar expression as the skin color. So that, the components after adjusting are $$\begin{cases} Y' = Y + \Delta_Y \\ r' = r + \Delta_r \\ \theta' = \theta + \Delta_\theta \end{cases} \quad (4)$$

The $(Y,r,\theta)$ before adjusting and the $(Y',r',\theta')$ after adjusting should keep continuously and monotony changing to avoid discontinuity and nonconforming.

Figure 4:
FIG. 4 is a processed image.
Figure 5:
FIG. 5 is a non-processed image.

Refer to FIG. 4 and FIG. 5, they are illustrated effect comparing the image with image processing with the image without image processing;

Step D) if needed, to change the YUV color space located by the coordinate $(Y',r',\theta')$ to the color space to perform other processing or output, such as $(Y',U',V')$. In addition, adjust the components' color saturation and hue globally, before inverse converting of the coordinate.

Figure 6:
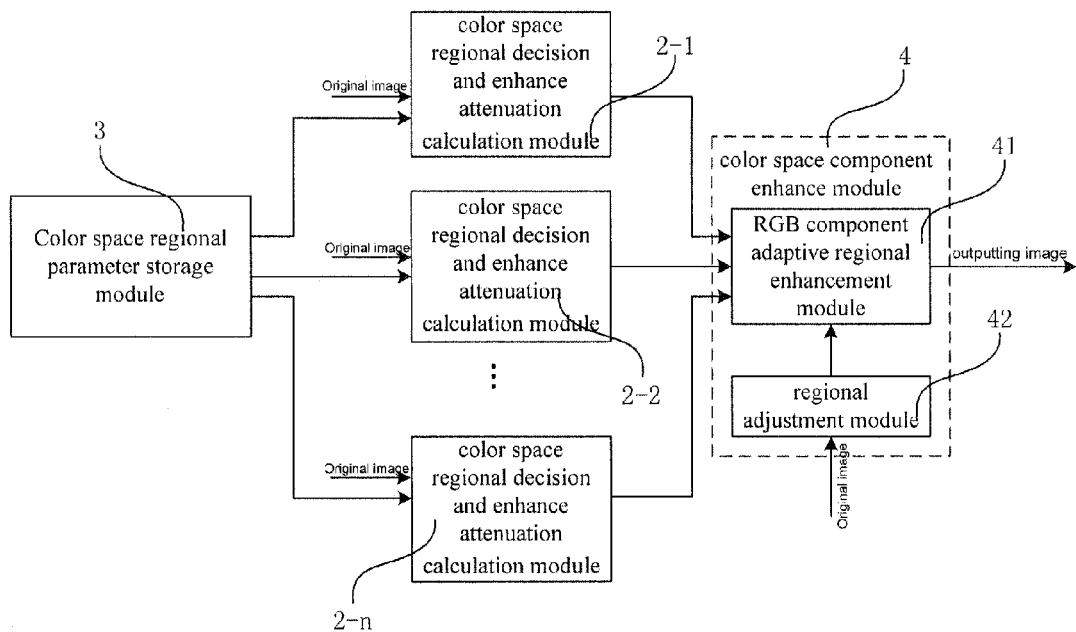
FIG. 6 is a block diagram of an embodiment of a processing apparatus for enhancing the image color.

FIG. 6 is a block diagram of an embodiment of a processing apparatus for enhancing the image color. The apparatus includes n color space regional decision and enhance attenuation calculation module 2-1~2-n and color space component enhance module 4 comprising RGB component adaptive regional enhancement module 41 connected with regional adjustment module 42 each other, in which, RGB component adaptive regional enhancement module 41 is coupled to all color space regional decision and enhance attenuation calculation module 2-1~2-n.

Figure 7:
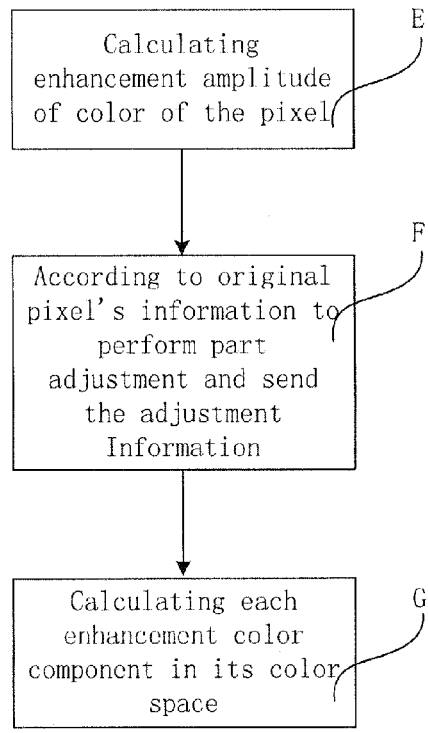
FIG. 7 is a flowchart of an embodiment of a method for enhancing the image color.

In this embodiment, the adjusting is considering in the RGB color space, simultaneously, also considering the part adjusting after making whole adjusting to reduce risk. The process steps are basically same as steps mentioned in the above embodiment. In the RGB color space, it's possible not only to adjust, the Red, Green, Blue, these three color components, but also to correspondingly enhance their complementary color, the Cyan, Magnet and yellow. FIG. 7 is a flowchart of method of this embodiment.

Step (E) The color space regional decision and enhance attenuation calculation module calculates the enhanced amplitude of color of the pixel and sends to RGB component adaptive regional enhancement module in accordance with the color enhancement parameters of each region of color space deployed by color space regional parameter storage module;

Step (F) regional adjustment module performs part adjustment such as limiting the data boundary in accordance with original pixel information input, and then sends adjustment information to RGB component adaptive regional enhancement module;

Step (G) according to enhanced amplitude of color of the pixel, RGB component adaptive regional enhancement module computes each enhancement component of color of the color space which the pixel is located to and then output the sum of these enhanced color components accumulated with the original color components of the pixel.

The calculation step of these three color components $\Delta_R$, $\Delta_G$ and $\Delta_B$ is similar to the step presented in the above embodiment, like $$\begin{cases} \Delta_R = g_1(\Delta, \alpha_R) \\ \Delta_G = g_2(\Delta, \alpha_G), \\ \Delta_B = g_3(\Delta, \alpha_B) \end{cases}$$

where, the expression of function g(.) is similar to the mentioned in above embodiment. It has many fashions, and corresponding $(\alpha_R, \alpha_G, \alpha_B)$ respectively represents adjustment weight in three direction of RGB. The color enhancement is denoted $(R',G',B') = f(R,G,B,p,\alpha)$;

Parameters $p, \alpha$ determine the intensity and direction of enhancement. For example, when $(p_i, \alpha_i) = \text{Red}$, the component R of the pixel of region partitioned by the parameters $p_i, \alpha_i$ will be obviously higher than components GB. When adjusted, $\Delta_R$ increased, $\Delta_G, \Delta_B$ decreased as possible, so as to make the Red be pure and compensate the change of brightness. Simultaneously, as the first exemplary embodiment, the continuity and monotony of the direction of the enhanced intensity of enhancement region also can be pretty guaranteed by the function of f(.), g(.) and parameter $(\Delta_R, \Delta_G, \Delta_B)$.

Finally output the color components after adjusting $$\begin{cases} R' = R + \Delta_R \\ G' = G + \Delta_G \\ B' = B + \Delta_B \end{cases}. \qquad 5$$

The adjustment of the RGB region maybe influence the change of the whole image brightness, for those application needed keeping brightness, it is needed to compensate the influence of adjustment mete to brightness. For example, $\Delta_{Luma,601} = 0.299\Delta_R + 0.587\Delta_G + 0.114\Delta_B$, so the final RGB adjusting mete is written as $\Delta'_R = \Delta_R - \kappa \cdot \Delta_{Luma,601}$ $\Delta'_G = \Delta_G - \kappa \cdot \Delta_{Luma,601}$ $\Delta'_B = \Delta_B - \kappa \cdot \Delta_{Luma,601}$ Where, $\kappa$ is the corresponding reduction coefficient of adjustment, during the range of 0-1. This process is not necessary, because in some applications the requirement for change of brightness is not rigidly requested, The present computes the intensity and component direction to be enhanced/adjusted in accordance with the position of pixel in color space (Collective) and parameters of image/video so as to achieve the enhancement of the color components. For the enhancement/adjustment algorithm is based on the part region of color space, it is possible to accurately compute enhancement/adjustment inside region and effectively avoid and control risk and side-effect.

It should be understood that the above embodiments are used only to explain, but not to limit the present. Despite the detailed description of some embodiments, it should be understood that various modifications, changes or equivalent replacements can be made by those skilled in the art without departing from the spirit and scope covered in the following claims.

I claim:

1. A processing apparatus for enhancing image color, comprising:
    a color space regional parameter storage module to store adjustment parameters each of at least two color space regions;
    a plurality of color space regional decision and enhancement attenuation calculation modules to calculate a color enhancement amplitude of a pixel responsive to the parameters for a region, wherein each color space regional decision modules corresponds to a color space region;
    a color space component enhancement module to calculate a component of the color enhancement amplitude of the pixel in its color space based upon the color enhancement amplitude of the pixel in each region.

2. The processing apparatus of claim 1 comprising:
    a color space conversion module to convert a color space of an original image into a YUV color space and to convert the YUV color space into a polar coordinate system.

3. The processing apparatus of claim 2 comprising:
    a color space inverse conversion module to convert the YUV color space into a color space other than the YUV color space.

4. The processing apparatus of claim 1 where the color space component enhancement module includes:
    an RGB component adaptive regional enhancement module; and
    a regional adjustment module connected to the RGB component adaptive regional enhancement module.

5. A method for enhancing image color comprising:
    calculating a color enhancement amplitude of a pixel responsive to parameters associated with each of at least two color space regions;
    calculating a color enhancement component in each color space responsive to the color enhancement amplitude in each color space region;
    adding the calculated color enhancement components in each color space to the pixel.

6. The method of claim 5 comprising converting a YUV color space coordinate into a polar coordinate before calculating the color enhancement amplitude.

7. The method of claim 6 comprising converting a color space of a pixel into the YUV color space before converting the YUV color space coordinate into the polar coordinate.

8. The method of claim 5 comprising:
    converting the YUV color space into a color space other than a YUV color space after calculating the color enhancement component in each color space.

* * * * *